United States Patent [19]

Bohn

[11] Patent Number: 5,089,803
[45] Date of Patent: Feb. 18, 1992

[54] PARKING LOT CAR LOCATOR

[76] Inventor: Frank W. Bohn, 1825 Ross Ave., Scranton, Pa. 18509

[21] Appl. No.: 496,548

[22] Filed: Apr. 23, 1990

[51] Int. Cl.⁵ .............................................. B60Q 1/00
[52] U.S. Cl. .................................. 340/425.5; 116/28 R; 116/173
[58] Field of Search ............... 340/425.5, 468, 480, 340/485, 539, 331, 932.2; 116/28 R, 42, 48, 173; 40/591-593, 607; 362/72, 173

[56] References Cited

U.S. PATENT DOCUMENTS

| | | | |
|---|---|---|---|
| 3,046,934 | 7/1962 | Swezy | 116/28 R |
| 3,080,139 | 3/1963 | Caprioli | 116/173 |
| 3,136,289 | 6/1964 | Johnson | 116/28 R |
| 3,506,956 | 4/1970 | Kolm et al. | 340/425.5 |
| 3,908,179 | 9/1975 | Heehler et al. | 340/471 |
| 4,052,697 | 10/1977 | Daifotes | 116/28 R |
| 4,274,127 | 6/1981 | Beck et al. | 116/173 |
| 4,309,741 | 1/1982 | Smith | 362/72 |
| 4,650,147 | 3/1987 | Griffin | 116/28 R |
| 4,763,230 | 8/1988 | Cummings et al. | 362/72 |
| 4,976,410 | 12/1990 | Tomaiuolo | 116/173 |
| 4,986,209 | 1/1991 | Spica | 116/173 |

Primary Examiner—Jin F. Ng
Assistant Examiner—Brent A. Swarthout
Attorney, Agent, or Firm—Kane, Dalsimer, Sullivan, Kurucz, Levy, Eisele and Richard

[57] ABSTRACT

The invention relates to an improved car finder apparatus that instantly identifies one's automobile in a parking lot or other area through a personally selected number of large and small flags and/or flashing and non-flashing lights.

11 Claims, 6 Drawing Sheets

PARKING LOT CAR LOCATOR

BACKGROUND OF THE INVENTION

1. Field of the Invention

The invention is in the field of car finders that are meant to locate a car in a large parking lot or other area where it may be difficult to ascertain where one's car is.

2. Description of the Prior Art

There are prior art devices that have a similar purpose but none that applicant is aware of that can personally identify one's own car. None are as fool-proof and instantly changeable.

SUMMARY OF THE INVENTION

The invention is an improved car finder that comprises a system of replaceable flashing or non-flashing lights and/or large and small flags that can be arranged in various configurations to personally identify one's car. The user arranges the various sized flags or lights in any number of configurations that he can instantly recognize upon returning to his car even if there are other cars using the same car finder system.

It is the object of this invention to provide an identifying system for automobiles that is fast and simple to change from one configuration to any one of a thousand others in a matter of seconds.

It is another object of the invention to provide a means to identify cars from other cars that are using similar devices in the same area.

DESCRIPTION OF THE PREFERRED EMBODIMENT

Figure 1A:
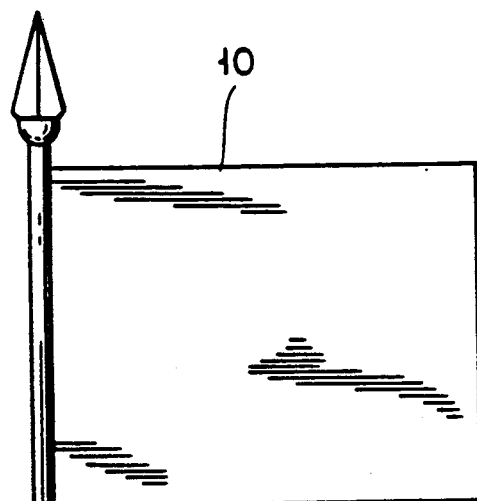
FIG. 1A represents a partial side view of the holder shown in FIG. 1.
Figure 1A:
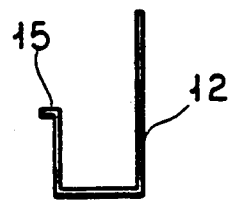
Figure 1:
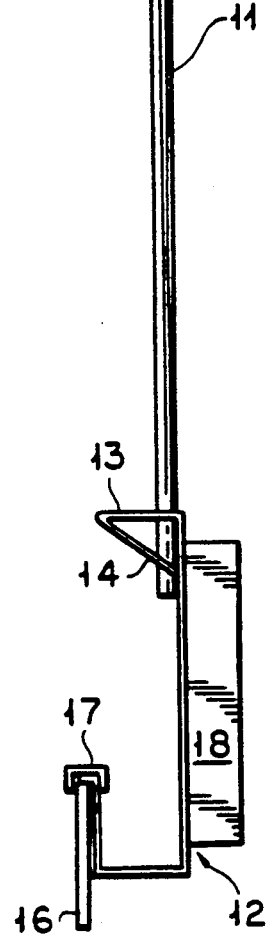
FIG. 1 shows the basic configuration of the flag and holder.
Figure 6A:
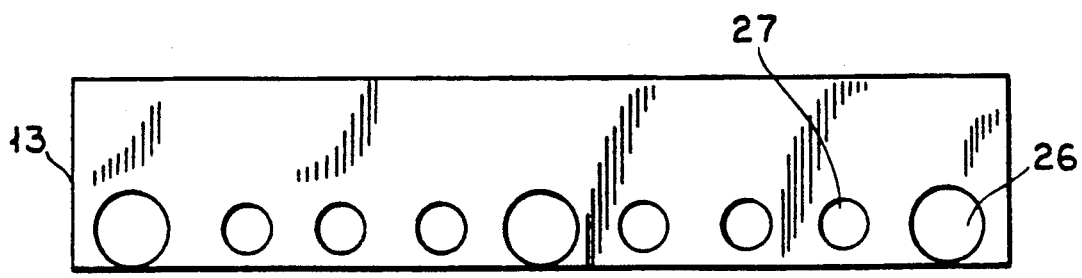
FIG. 6A represents a superior vertical view of a flag holding surfaces in FIG. 6.
Figure 6:
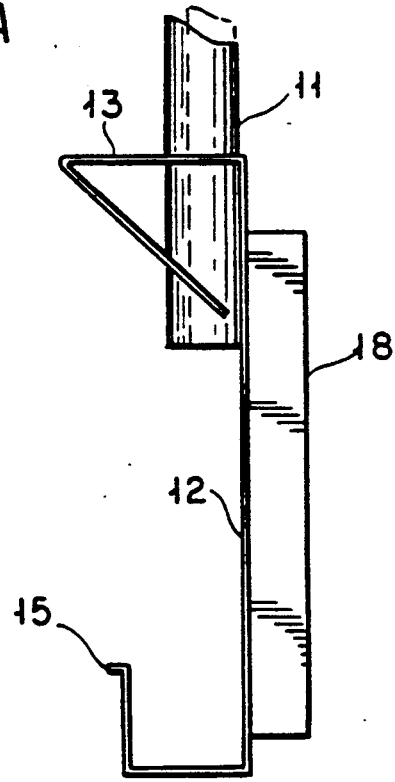
FIG. 6 shows flag holders.

The car finder is attached with the holding device 12 shown in FIG. 1. This device has a lip 15 that is placed between the top of the window 16 and the window frame 17. To use, the lip 15 is placed on top of the rolled down window 16 and then the window 16 is rolled up. The lip 15, in FIGS. 1, 2, 3, 4, and 6, is made to be of a minimal width so that it can fit on the windows of all cars. If the lip 15 was wider it would not fit into the space between the window 16 and the frame 17 of some cars that have a window that is thinner than the lip 15 of this holder. At the top of the holder 12, FIG. 6 is a pedestal 13, with a number of holes 26,27 in it for holding various numbers of flags to be used in it. The end 14 of holder 12 is bent over and acts like a spring-clip holding the various flagstaffs 11,23 in place, as is more clearly shown in FIGS. 3 and 4.

The locating apparatus is a combination of large and small flags 10,22 in various quantities complemented by a number of flashing and/or non-flashing lights of various colors set in a preselected pattern to identify the user's car. For instance, different colored replaceable lights may be used. With a three light combination and assuming 10 different colors, there would be a thousand possible combinations of flags and lights to identify one's car. Non-flashing replaceable lights 19 may also be used.

Figures 5, 5A:
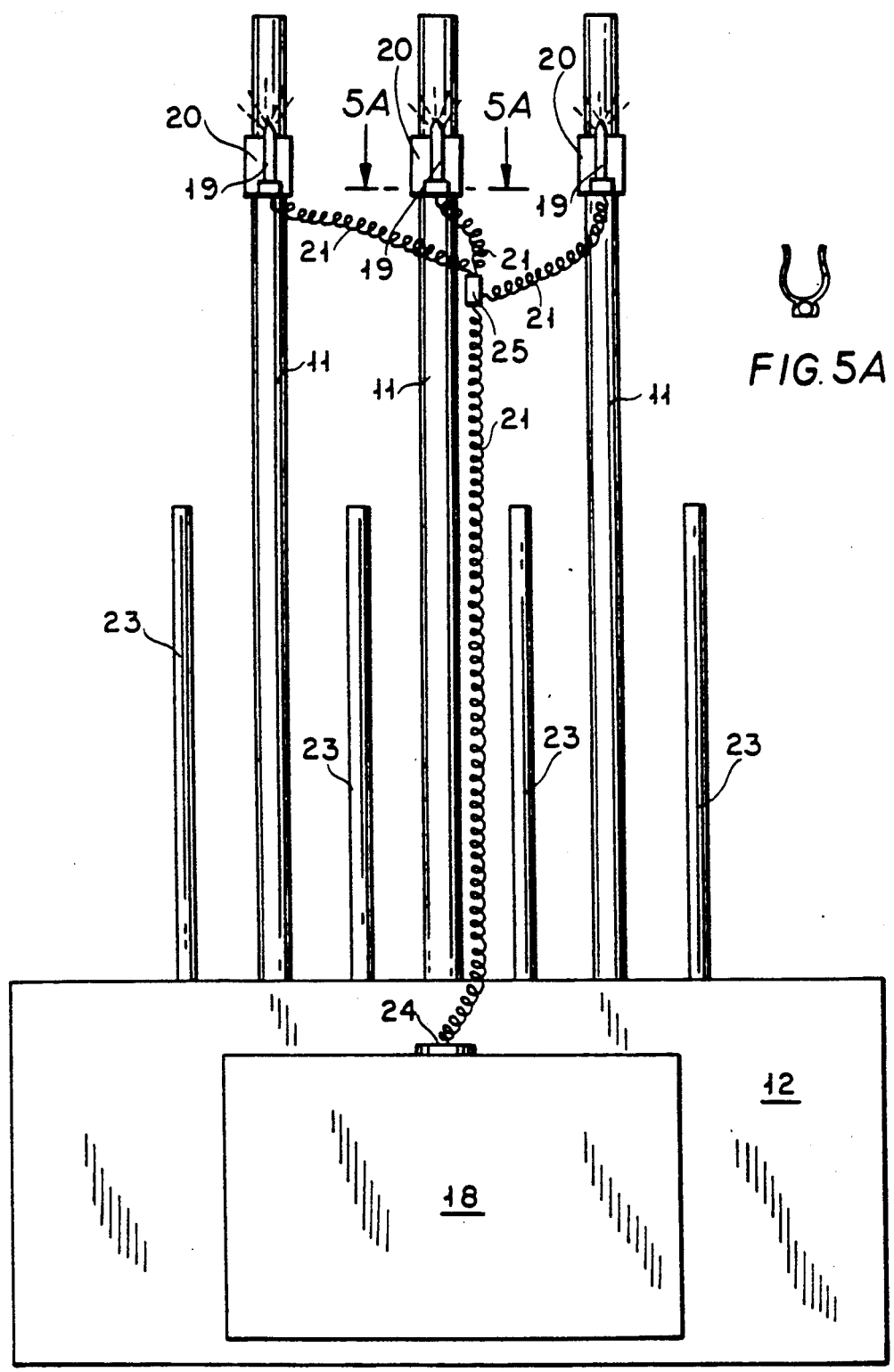
FIG. 5 shows a wiring arrangement.
FIG. 5A represents a cross-sectional view across line 5A—5A in FIG. 5.

Flashing lights may also be used. This would be useful if and when the time comes that parking lots become filled with a plethora of the standard large and small flag combinations. In that case it would be helpful in picking one's car out of a lot with a multitude of similar locating devices, be they lights or flags. Flashing lights 19 are connected with parallel wiring 21, as shown in FIG. 5. This parallel wiring method enables either one, two, or three lights to be flashing at any given time. This makes a car easy to identify.

Figures 3, 3A:
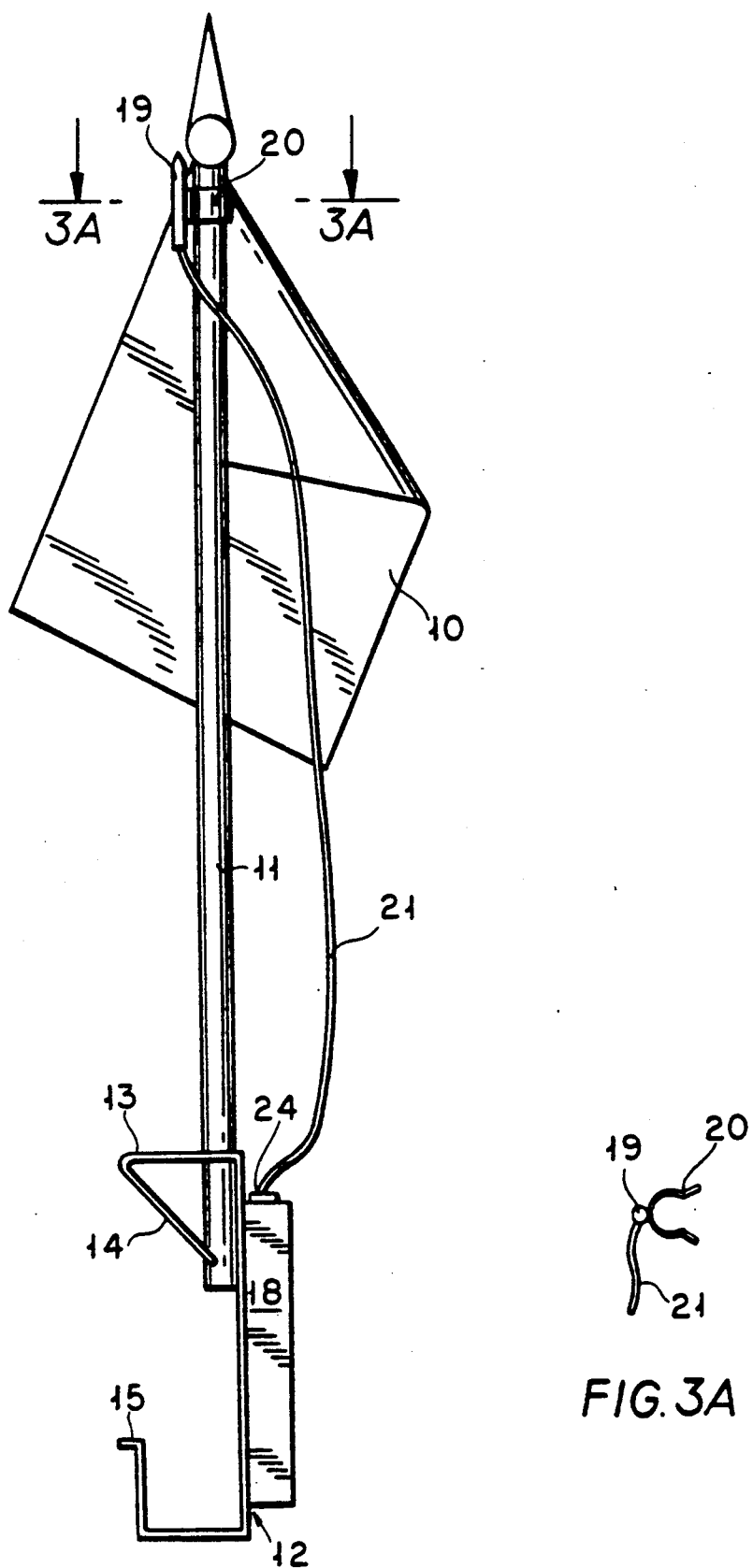
FIG. 3 shows the battery pack and attachment to a flag.
FIG. 3A represents a cross-sectional view across line 3A—3A in FIG. 3.

The light finders are powered by their own battery supply 18, in FIGS. 1, 3, 5 and 6. FIGS. 3 and 5 show the electrical connections 24,25 to the lights. The battery supply 18 is secured to the back of the car finder holding device 12, and has a weather proof plug 24 to activate the flashing lights 19.

Figure 2:
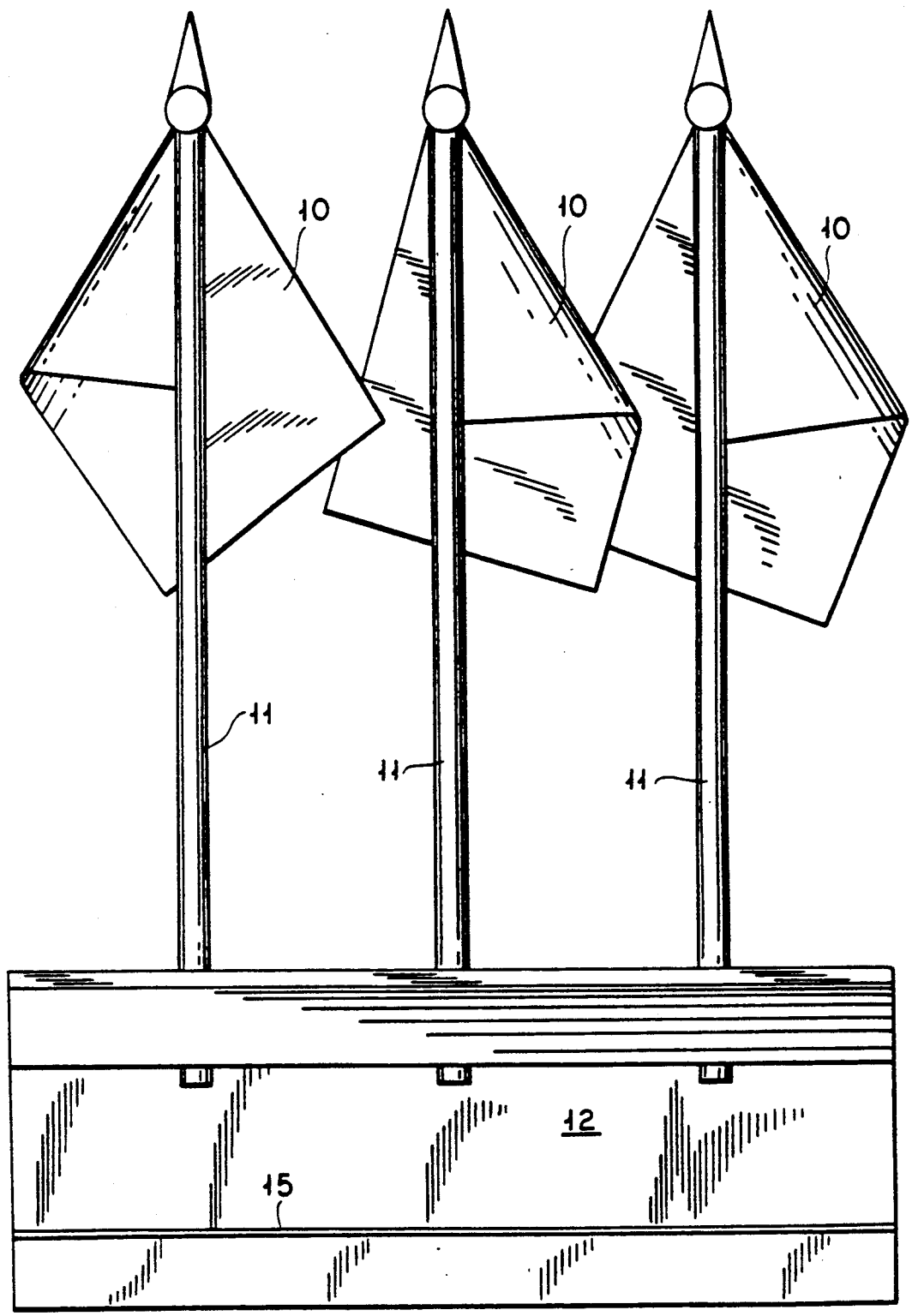
FIG. 2 shows a three flag combination.
Figure 4:
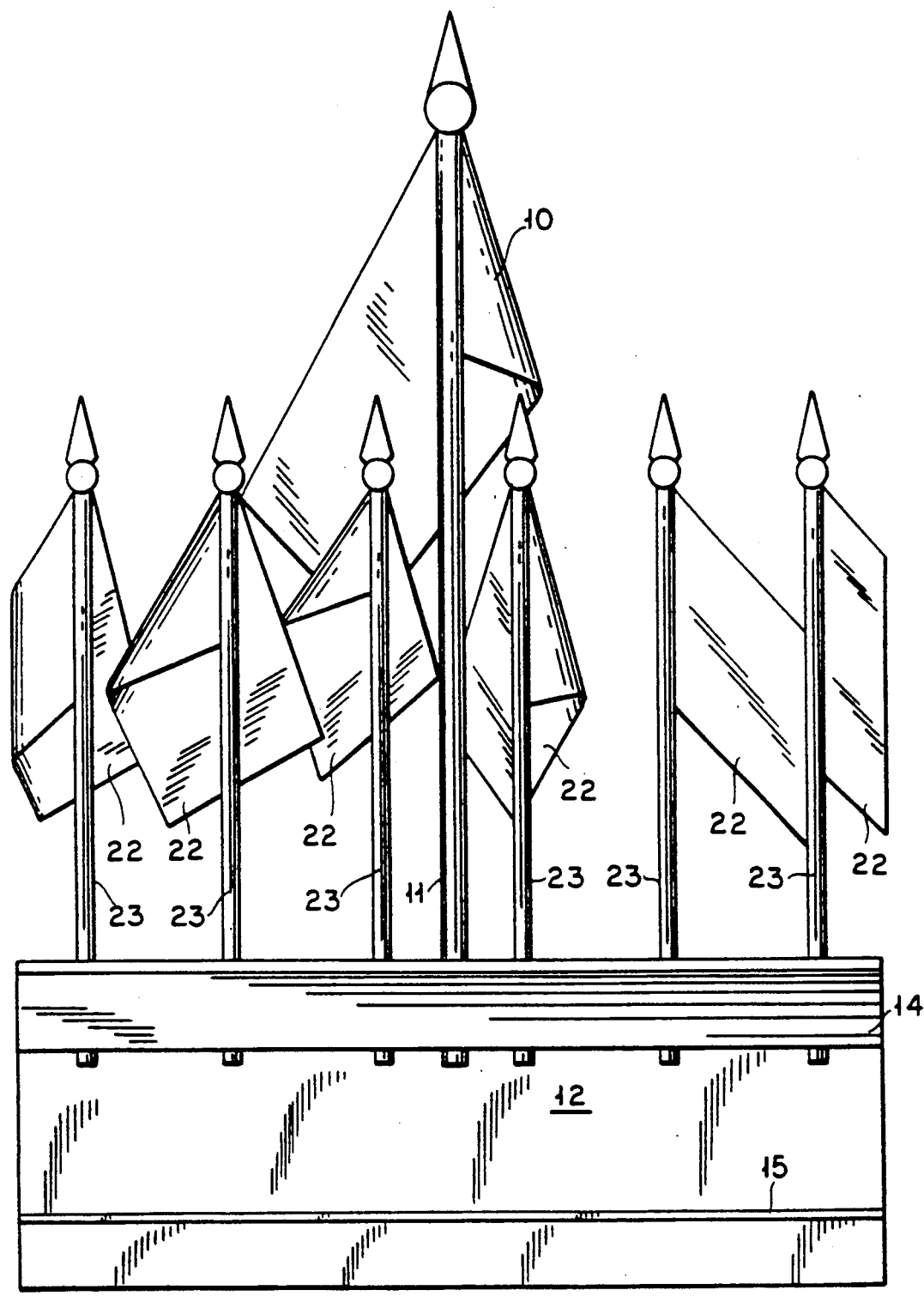
FIG. 4 shows configurations of flags.

Flags can also be used along similar lines. Combinations can be based on the number of large and/or small flags that are placed in the large or small holes 26,27, FIG. 6A. FIG. 2 shows a display using only large flags 10. FIGS. 4 and 5 show a display using large 10 and small flags 22. FIG. 3 shows the mini flashing light 19 secured to a large flagstaff 11. FIGS. 3 and 5 show the mini flashing lights 19, secured to large flagstaff 11, and the mounting clamp 20, that secures it to the large 10 or small flags 22. For example, one, two or three large flags 10 could be used, or one, two, three, or four small flags 22 could be used, or any combination of large 10 and small flags 22, and/or flashing and non-flashing lights 19. Large flagstaffs 11 would be attached to the car finder in holes 26, and the small flagstaffs 23 would be inserted into holes 27, FIG. 6A.

These car finders could be easily stored in the glove compartment. The same car finder could also be used by various car owners of the same family, as it can be easily used on all cars.

I claim:

1. A vehicle identifying apparatus, comprising:
   a base holding unit made primarily from a sheet of material having two opposing edges, a first edge being formed into vehicle mounting means and a second, opposite edge being formed into a flagstaff holding means;
   at least one flagstaff removably and securely held to said base holding unit by said flagstaff holding means; and an electric light system comprising:
   a battery pack affixed to said base holding unit;
   parallel electrical wiring connecting said battery pack to at least one electric light unit comprising a socket and a bulb;
   an electric light snap fit mounting means for mounting said at least one electric light unit to said at least one flagstaff; and
   an easily removable connection connecting said parallel wiring and said battery pack.

2. The vehicle identifying apparatus of claim 1, wherein said base holding unit defines a plurality of folds of said sheet of material, said folds forming a lip at said first edge of said sheet material configured to engage a top edge of a vehicle window and be pinched between said vehicle window and a window frame; and a dropoff section in juxtaposition with a face of said vehicle window.

3. The vehicle identifying apparatus of claim 1, wherein said flagstaff holding means further comprises:

a plurality of folds of said sheet of material, said folds forming a pedestal section running substantially horizontally and having at least one hole dimensioned for a slip fit of an end of said at least one flagstaff; and a springlock section, being folded at an acute angle from a distal end of said pedestal section and being configured to engage said end of said at least one flagstaff by deforming resiliently.

4. The vehicle identifying apparatus of claim 1, further comprising:

at least one flag being securely attached by an edge to said at least one flagstaff.

5. The vehicle identifying apparatus of claim 1, wherein at least one of said least one electric light is of a flashing design.

6. The vehicle identifying apparatus of claim 1, wherein said electric light system is of a weatherproof design.

7. The vehicle identifying apparatus of claim 6, wherein at least one of said at least one electric light is colored.

8. A vehicle identifying apparatus, comprising:

a base holding unit made primarily from a sheet of material having two opposing edges, a first edge being formed into vehicle mounting means and a second, opposite edge being formed into a flagstaff holding means;

at least one flagstaff removably and securely held to said base holding unit by said flagstaff holding means;

said vehicle mounting means comprising a plurality of folds of said sheet of material, said folds forming a lip at said first edge of said sheet material configured to engage a top edge of a vehicle window and be pinched between said vehicle window and window frame; and a dropoff section in juxtaposition with a face of said vehicle window;

said flagstaff holding means comprising a plurality of folds of said sheet of material, said folds forming a pedestal section running substantially horizontally and having at least one hole dimension for a slip fit of an end of said at least one flagstaff;

a springlock section, being folded at an acute angle from a distal end of said pedestal section and being configured to engage said end of said at least one flagstaff by deforming resiliently; and a weatherproof electric light system comprising:

a battery pack affixed to said base holding unit;

parallel electrical wiring connecting said battery pack to at least one electric light unit comprising a socket and a bulb, each bulb being (a) flashing or non-flashing and (b) colored or non-colored;

an easily removable connection connecting said parallel wiring and said battery pack; and an electric light snap fit mounting means for mounting said at least one electric light unit to said at least one flagstaff.

9. A vehicle identifying apparatus of claim 8, further comprising:

at least one flag securely attached by an edge to said at least one flagstaff.

10. A method of using a vehicle identifying device comprising the steps of:

providing a multiple flagstaff holding base with a narrow lip on one end;

rolling down a vehicle window;

placing said lip on a top edge of said vehicle window;

pinching said lip between said top edge of said vehicle window and a window frame by rolling up said vehicle window while maintaining said lip in place on said top edge;

picking a unique pattern of at least one flag on at least one flagstaff;

inserting said at least one flagstaff in said unique pattern into said multiple flagstaff holding base; and, identifying the vehicle via the unique pattern.

11. The method of using a vehicle identifying device of claim 10, further comprising the steps of:

removing said at least one flagstaff in said unique pattern from multiple flagstaff holding base;

lowering said vehicle window and removing said multiple flagstaff holding base.

* * * * *